United States Patent
Yoshiyama et al.

(10) Patent No.: US 7,845,248 B2
(45) Date of Patent: Dec. 7, 2010

(54) SHIFT-BY-WIRE CONTROL SYSTEM FOR AUTOMATIC TRANSMISSION DEVICE AND METHOD FOR THE SAME

(75) Inventors: Shigeru Yoshiyama, Kariya (JP); Kiyoshi Kimura, Obu (JP); Taku Itoh, Chita-gun (JP); Kenichi Oishi, Obu (JP); Atsushi Kamada, Nishikamo-gun (JP); Yoshinobu Nozaki, Anjo (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 457 days.

(21) Appl. No.: 11/882,815

(22) Filed: Aug. 6, 2007

(65) Prior Publication Data

US 2008/0039282 A1 Feb. 14, 2008

(30) Foreign Application Priority Data

Aug. 8, 2006 (JP) .............................. 2006-215392

(51) Int. Cl.
*F16H 59/00* (2006.01)
*B60K 17/04* (2006.01)
*B60K 20/00* (2006.01)
*B60W 10/10* (2006.01)

(52) U.S. Cl. .................. 74/335; 74/473.12; 74/473.21; 192/219.6

(58) Field of Classification Search .................. 74/335, 74/473.1, 473.12, 473.13, 473.21, 473.24, 74/473.25, 473.26, 473.3; 192/219.4–219.7
See application file for complete search history.

(56) References Cited

U.S. PATENT DOCUMENTS 3,552,518 A * 1/1971 Aidner et al. ............... 180/287

5,117,710 A 6/1992 Asano et al.

(Continued)

FOREIGN PATENT DOCUMENTS

DE 41 18 519 2/1993

(Continued)

OTHER PUBLICATIONS

Korean Intellectual Property Office Notice of Invitiation to Submit Opinion dated Aug. 21, 2008 issued in counterpart Korean Application 10-2007-0078806 with English translation.

(Continued)

*Primary Examiner*—Roger Pang
(74) *Attorney, Agent, or Firm*—Nixon & Vanderhye. PC

(57) ABSTRACT

A shift-by-wire control system includes a parking lock device that brings an output shaft of an automatic transmission device to a lock state when a range switching unit switches to the P-range. The parking lock device brings the output shaft to a lock-release state when the range switching unit switches to another shift range. An electric motor actuates the range switching unit and the parking lock device in accordance with an instruction of an operator. A manual device transmits manual operation force of the operator to the parking lock device when the electric motor stops. The manual device includes a one-way transmission unit permitting transmission of the manual operation force in a direction toward the lock state, and prohibiting transmission of the manual operation force in a direction toward the lock-release state.

5 Claims, 3 Drawing Sheets

U.S. PATENT DOCUMENTS

| | | | |
|---|---|---|---|
| 5,704,457 A * | 1/1998 | Kimura et al. | 192/220.2 |
| 6,273,232 B1 | 8/2001 | Kimura et al. | |
| 6,688,448 B2 | 2/2004 | Giefer et al. | |
| 6,752,036 B2 | 6/2004 | Kropp et al. | |
| 6,755,284 B2 * | 6/2004 | Revelis et al. | 188/2 D |
| 2002/0148318 A1 | 10/2002 | Giefer et al. | |
| 2003/0221499 A1 | 12/2003 | Wong | |
| 2006/0278029 A1 | 12/2006 | Burgbacher | |

FOREIGN PATENT DOCUMENTS

| | | |
|---|---|---|
| JP | 2595740 | 9/1991 |
| JP | 6-1157 | 1/1994 |
| JP | A-7-137555 | 5/1995 |
| JP | A-11-325243 | 11/1999 |
| JP | 2001-271925 | 10/2001 |
| JP | 2003-028293 | 1/2003 |
| JP | 2003-130209 | 5/2003 |
| JP | 2004-513307 | 4/2004 |
| JP | 2005-36957 | 2/2005 |

OTHER PUBLICATIONS

Chinese Office Action dated Oct. 17, 2008 issued in the corresponding CN application No. 200710141131.1 with English translation.

Japanese Office Action dated Jun. 25, 2008, issued in corresponding Japanese Application No. 2006-215392, with English translation.

* cited by examiner

SHIFT-BY-WIRE CONTROL SYSTEM FOR AUTOMATIC TRANSMISSION DEVICE AND METHOD FOR THE SAME

CROSS REFERENCE TO RELATED APPLICATIONS

This application is based on and incorporates herein by reference Japanese Patent Application No. 2006-215392 filed on Aug. 8, 2006.

FIELD OF THE INVENTION

The present invention relates to a shift-by-wire control system for an automatic transmission device. The present invention further relates to a method for operating the shift-by-wire control system.

BACKGROUND OF THE INVENTION

U.S. Pat. No. 6,752,036 B2 (JP-A-2004-513307) discloses a shift-by-wire control system including an electric motor for actuating a range switching unit. Specifically, the shift-by-wire control system detects an instruction shift range selected by an occupant of a vehicle, so that the electric motor actuates the range switching unit to switch a shift range of the vehicle in accordance with the instruction shift range. In a conventional shift-by-wire control system, a parking lock device brings an output shaft of an automatic transmission device to a lock state in conjunction with the range switching unit when switching to a P-range (parking range). The parking lock device also brings the output shaft of the automatic transmission device to a lock-release state in conjunction with the range switching unit when switching to a shift range other than the P-range.

In such a shift-by wire system, even when the electric motor cannot be supplied with electric power due to, for example, defect in a battery, the output shaft of the automatic transmission device is preferably brought to the lock state in order to park the vehicle. The shift-by-wire control system in U.S. Pat. No. 6,752,036 B2 is provided with a mechanical component such as a carriage, a lock member, a spring adapted to mechanically actuating the parking lock device, regardless of an electric power source.

However, in the structure of U.S. Pat. No. 6,752,036 B2, the parking lock device can be actuated regardless of a condition of the electric power source. Accordingly, the vehicle may be stolen, even when the vehicle is parked in a condition where the automatic transmission device is set at the P-range and is in the lock state. Specifically, the mechanical component of the parking lock device may be maliciously operated, and the automatic transmission device in the lock state may be brought to the lock-release state. In this case, the vehicle may be stolen.

SUMMARY OF THE INVENTION

In view of the foregoing and other problems, it is an object of the present invention to produce a shift-by-wire control system capable of protecting a vehicle against theft, in addition to being capable of bringing an automatic transmission device to a lock state even when electric power is not supplied. It is another object of the present invention to produce a method for operating the shift-by-wire control system.

According to one aspect of the present invention, a shift-by-wire control system for an automatic transmission device manipulated by an operator, the shift-by-wire control system including a range switching unit for switching a shift range of the automatic transmission device between a P-range and an other shift range than the P-range. The shift-by-wire control system further includes a parking lock device adapted to bringing an output shaft of the automatic transmission device to a lock state in conjunction with the range switching unit when switching to the P-range. The parking lock device is adapted to bringing the output shaft of the automatic transmission device to a lock-release state in conjunction with the range switching unit when switching to the other shift range. The shift-by-wire control system further includes an electric motor for actuating the range switching unit and the parking lock device in accordance with an instruction of the operator. The shift-by-wire control system further includes a manual device for transmitting manual operation force of the operator to the parking lock device to actuate the parking lock device when the electric motor stops. The manual device includes a one-way transmission unit adapted to permitting transmission of the manual operation force in a direction in which the parking lock device is brought to the lock state. The one-way transmission unit is adapted to prohibiting transmission of the manual operation force in a direction in which the parking lock device is brought to the lock-release state.

According to another aspect of the present invention, a method for operating a shift-by-wire control system for an automatic transmission device, the method including permitting transmission of manual operation force applied by an operator to lock an output shaft of the automatic transmission device in a condition where electricity supply stops in the shift-by-wire control system and a shift position of the automatic transmission device is in a P-range. The method further includes prohibiting transmission of the manual operation force to release the lock of the output shaft in a condition where electricity supply stops in the shift-by-wire control system and the shift position is in the P-range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
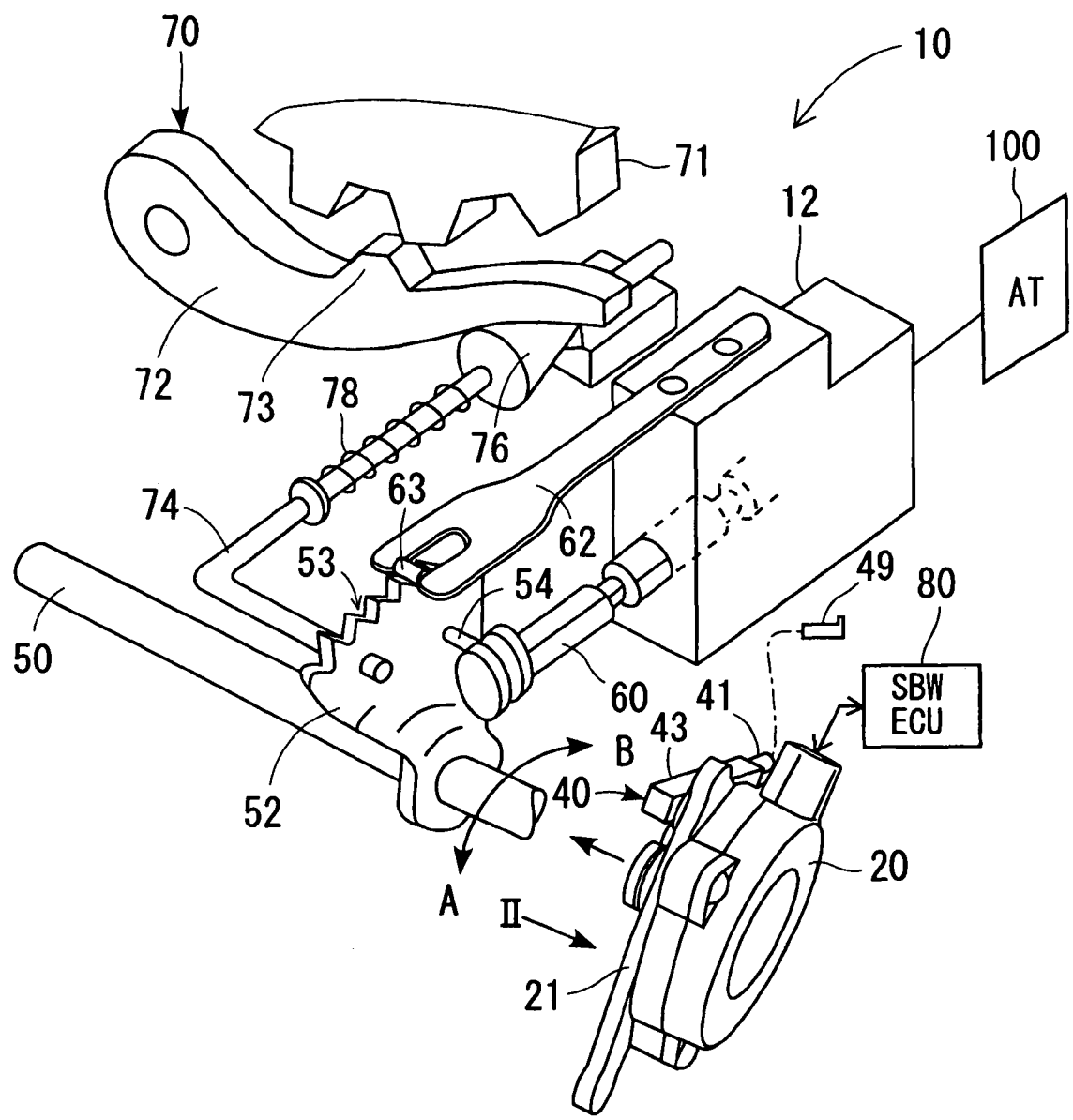
FIG. 1 is a schematic view showing a shift-by-wire control system.

First, a shift-by-wire control system 10 is described with reference to FIG. 1. The shift-by-wire control system 10 is provided for controlling a vehicle such as a two-wheel drive vehicle and a four-wheel drive vehicle. The shift-by-wire control system 10 includes an actuator 20, an ECU 80, a parking lock device 70, and an automatic transmission control device 12. The ECU 80 is provided for controlling the shift-by-wire control system (SBW system) 10.

The ECU 80 is an electronic circuit constructed of a microcomputer having a CPU, a RAM, a ROM, an EEPROM, and the like, for controlling the shift-by-wire control system 10. A driver operates, for example, an unillustrated shift lever to select an instruction shift range. The ECU 80 detects the instruction shift range, thereby manipulating the actuator 20 corresponding to the instruction shift range, so that the ECU 80 controls an axial position of a manual valve 60 serving as a range switching unit.

The manual valve 60 axially moves corresponding to the instruction shift range, thereby switching hydraulic passages in the automatic transmission control device 12 to change a shift range of an automatic transmission device 100. The driver may change the shift range by operating, for example, a shift switch such as a button. Alternatively, the driver may acoustically instruct a voice recognition device to change the shift range. The shift position of the shift lever is detected using a detecting device such as contact switches, which have contact positions adapted to changing in conjunction with the operation of the shift lever.

The automatic transmission device 100 is controlled at one of shift ranges including moving ranges, a non-moving range, and a neutral range. Each of moving ranges corresponds to a D range and an R range. The D range is a forward moving range. The R range is a backward moving range. The non-moving range corresponds to the P range, which is a parking range. The neutral range corresponds to the N range. The D, R, and N ranges correspond to other ranges than the P range.

The automatic transmission control device 12 includes a hydraulic device for switching the shift range and shift position of the automatic transmission device 100. The manual valve 60 moves to switch the hydraulic circuits of the automatic transmission control device 12, and selects a range position. Thus, the automatic transmission control device 12 sets the automatic transmission device 100 at one of the shift ranges.

The ECU 80 detects the instruction shift range of the shift lever, which is operated by the driver, using the detecting device. The ECU 80 instructs an electric motor 22 (FIG. 3) of the actuator 20 to rotate for a rotation angle correspondingly to the detected instruction shift range. Thus, the ECU 80 controls the rotation angle of the electric motor 22 correspondingly to the instruction shift range.

A control rod 50 is connected with an output shaft (motor output shaft) 38 (FIGS. 2, 3) of the electric motor 22. The electric motor 22 produces driving force, so that the driving force is transmitted to the control rod 50 via an unillustrated reduction device such as reduction gears. The control rod 50 is fixed to a detent plate 52 such that the control rod 50 is rotatable together with the detent plate 52. As shown in FIG. 1, the detent plate 52 rotates in one of rotative directions A, B, thereby determining the axial position of the manual valve 60.

In this embodiment, the electric motor 22 is a switched reluctance motor (SR motor), which has a brushless structure not including a permanent magnet. The electric motor 22 has unillustrated coils each assigned to a U-phase, a V-phase, and a-W phase. The ECU 80 energizes and de-energizes a transistor to control electricity supplied to the coils of the electric motor 22. The ECU 80 sequentially switches electricity supplied to each of the coils of U, V, W-phases, thereby rotating the electric motor 22.

The actuator 20 has an unillustrated encoder serving as an angle detection unit. The ECU 80 controls rotation of the electric motor 22 with reference to a count value, which is indicated by a signal outputted from the encoder corresponding to an angular position of the electric motor 22, until the count value becomes a target count valve. Thus, the ECU 80 controls the rotation of the detent plate 52 to be in an angular position corresponding to the instruction shift range. The electric motor 22 rotates, and the count value reaches a predetermined count-value range including the target count value, so that the ECU 80 determines the detent plate 52 to be in an angular position corresponding to the instruction shift range. Thus, the ECU 80 terminates control of the rotation of the electric motor 22.

As the shift range changes from the P range to the R range, N range, and D range, the count value indicated by the signal of the encoder increases or decreases. The count value also decreases or increases as the shift range changes in the opposite order to the above order.

The detent plate 52 is a substantially sector-shaped plate having a substantially arc-shaped outer periphery defining multiple recessions 53. A detent spring 62 is a cantilever-blade spring fixed to the automatic transmission control device 12 at one fixed end. The detent spring 62 has the other end provided with a roller 63. The roller 63 is applied with resilience of the detent spring 62, and adapted to being hooked on one of the recessions 53 of the detent plate 52.

The detent plate 52 has a pin 54 hooked on the manual valve 60. As the detent plate 52 rotates together with the control rod 50, the manual valve 60 engaged with the pin 54 axially moves in accordance with the angular position of the detent plate 52. Each of the recessions 53 and the roller 63 are correlated to each predetermined position of the manual valve 60 correspondingly to each shift range. In this structure, when the roller 63 is properly hooked to one of the recessions 53, the manual valve 60 is set at one shift position corresponding to the one recession 53.

The electric motor 22 rotates, so that the manual valve 60 axially moves to a position correlated to one of the shift positions corresponding to the instruction shift range selected by the driver using the shift lever. In this operation, the automatic transmission control device 12 controls the shift position of the automatic transmission device 100 to correspond to an actual shift range determined by the axial position of the manual valve 60.

The actuator 20 has an unillustrated shift range detection device for detecting the rotation angle of the detent plate 52. The ECU 80 calculates the axial position of the manual valve 60 in accordance with the detection result of the shift range detection device, thereby being capable of detecting the actual shift range selected in the automatic transmission device 100.

The parking lock device 70 stops rotation of an output shaft of the automatic transmission device 100 by hooking a claw 73 of a parking lock pole 72 on a recession of the outer periphery of a parking gear 71. A park rod 74 has one end fixed to the detent plate 52. The park rod 74 has the other end fitted to a substantially conical shaped cam 76. The cam 76 is engaged with the park rod 74 in a condition where a spring 78 biases the cam 76 toward the other end of the park rod 74. The cam 76 is axially movable along the park rod 74.

As the detent plate 52 rotates, the park rod 74 axially moves, so that the cam 76 upwardly and downwardly actuates the parking lock pole 72. In this operation, the cam 76 hooks the claw 73 of the parking lock pole 72 on the parking gear 71, and detaches the claw 73 from the parking gear 71. When the claw 73 of the parking lock pole 72 is hooked to the parking gear 71, the automatic transmission device 100 is in a lock state where rotation of the output shaft of the automatic transmission device 100 is mechanically prohibited. When the claw 73 is detached from the parking gear 71, the automatic transmission device 100 is in a lock-release state where rotation of the output shaft of the automatic transmission device 100 is permitted.

In a normal operation of the shift-by-wire control system 10, driving force of the electric motor 22 is transmitted to the park rod 74 of the parking lock device 70 and the manual valve 60 via the motor output shaft 38, the control rod 50, and the detent plate 52. In this operation, the parking lock device 70 is actuated in conjunction with the manual valve 60. Specifically, when the manual valve 60 moves to a P-range position, the parking lock device 70 is in the lock state correspondingly to the position of the manual valve 60. When the manual valve 60 moves to a range position other than the P-range position, the parking lock device 70 is in the lock-release state correspondingly to the position of the manual valve 60.

Next, a manual device 40 is described in detail with reference to FIGS. 2, 3. In FIG. 1, the manual device 40 is unillustrated.

A non-electricity operating lever 49 (FIG. 1) is provided to a vehicle interior separately from the shift lever. An occupant such as the driver manipulates the non-electricity operating lever 49 in a non-electric power condition where the electric motor 22 cannot be supplied with electric power due to a defect such as a malfunction of a battery. The occupant manipulates the non-electricity operating lever 49, so that the manual device 40 manually actuates the parking lock device 70 to the lock state. Thus, the vehicle can be parked. Specifically, when the occupant applies manual operation force to the non-electricity operating lever 49, the manual device 40 transmits the manual operation force to the control rod 50, thereby actuating the parking lock device 70 and the manual valve 60.

Figure 2:
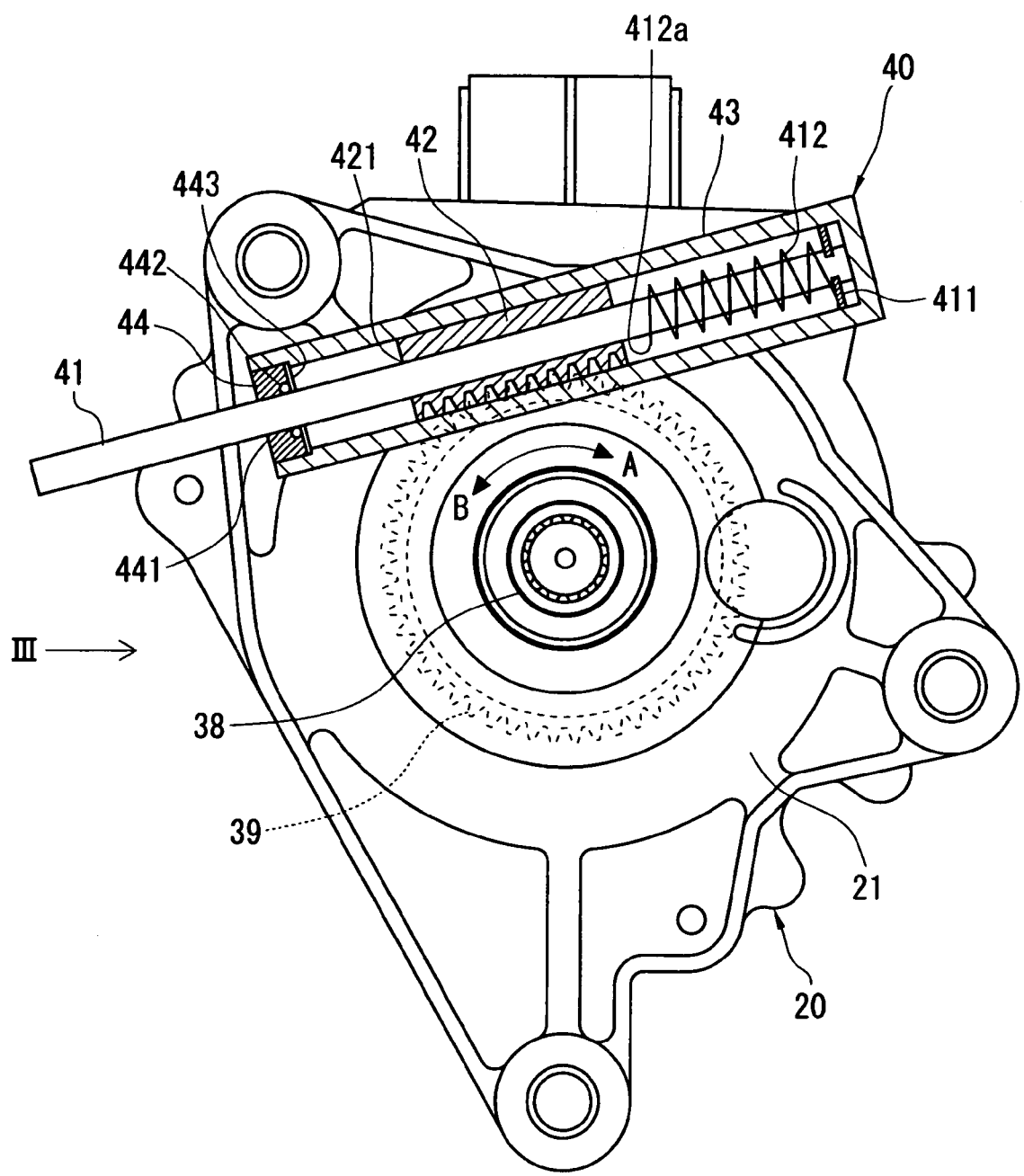
FIG. 2 is a view showing a manual device of the shift-by-wire control system when being viewed from the arrow II in FIG. 1.
Figure 3:
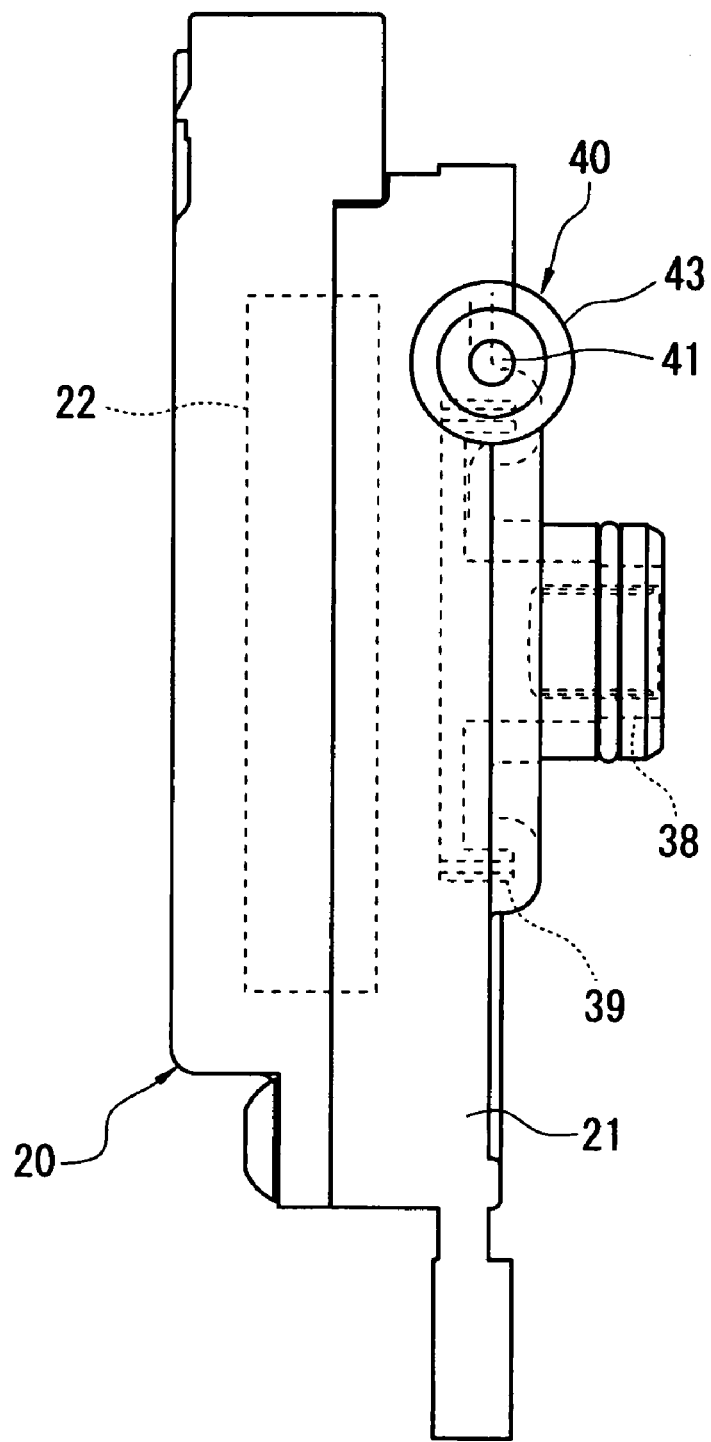
FIG. 3 is a view showing the manual device when being viewed from the arrow III in FIG. 2.

Referring to FIG. 2, the manual device 40 includes a rod 41, a plate 411, a spring 412, a P-in gear 42, and a manual-device case 43. The rod 41 and the P-in gear 42 are formed of, for example, a ferrous material. The manual-device case 43 is formed of, for example, aluminum. The rod 41, the plate 411, the spring 412, and the P-in gear 42 serve as a one-way transmission unit. The rod 41, the plate 411, and the spring 412 serve as a one-way hook member.

The actuator 20 is provided with an output shaft gear 39 being rotatable together with the motor output shaft 38 of the electric motor 22. The P-in gear 42 is regularly hooked to the output shaft gear 39. In the normal operation of the shift-by-wire control system 10, when the electric motor 22 actuates the manual valve 60 and the manual device 40, the output shaft gear 39 rotates. Therefore, in this structure, the P-in gear 42 is regularly driven. The P-in gear 42 is axially movable in the manual-device case 43 in conjunction with rotation of the output shaft gear 39. The manual-device case 43 has an opening through which the output shaft gear 39 is inserted into the manual-device case 43. The output shaft gear 39 is coaxial relative to the electric motor 22.

The manual-device case 43 is mounted to an actuator case 21 of the actuator 20. The actuator case 21 accommodates the electric motor 22, the reduction device, and the like. The manual-device case 43 is in a substantially cylindrical shape extending along the movable direction of the P-in gear 42. The manual-device case 43 has one axial closed end. The manual-device case 43 has the other axial end fitted with a bush 44. One end of the rod 41 is inserted into the manual-device case 43 through a through hole 441 of the bush 44. The other end of the rod 41 is outside the manual-device case 43, and is applied with the manual operation force transmitted from the non-electricity operating lever 49. The rod 41 axially moves in the same direction as the movable direction of the P-in gear 42, by being applied with the manual operation force. The bush 44 is provided with an O-ring 442 to seal between the bush 44 and the rod 41. The O-ring 442 is supported by a seal plate 443, thereby being maintained on the bush 44.

The plate 411 is fixed to the end of the rod 41, such that the plate 411 is slidable inside the manual-device case 43. In this structure, the one end of the rod 41 is slidably supported by the manual-device case 43 via the plate 411, and the other end of the rod 41 is slidably supported by the manual-device case 43 via the bush 44.

The P-in gear 42 has a through hole 421 extending along the movable direction. The rod 41 is in the through hole 421 and is slidable relative to the P-in gear 42. In this structure, the P-in gear 42 is axially slidable relative to the rod 41 via the through hole 421.

The spring 412 is a compression coil spring. The spring 412 is provided to the plate 411 on the side of the P-in gear 42. When the rod 41 is applied with the manual operation force, and is moved toward the plate 411, one end of the rod 41 is in contact with the inner wall of the manual-device case 43, as shown in the condition shown in FIG. 2. In this condition, the spring 412 is not in contact with the P-in gear 42 via a hook portion 412a. In this condition shown in FIG. 2, the spring 412 and the P-in gear 42 therebetween define a predetermined clearance. The spring 412 is not limited to being accommodated in the manual-device case 43. The spring 412 may be provided, for example, in the vicinity of the non-electricity operating lever 49.

In the condition shown in FIG. 2, when the rod 41 is applied with the manual operating force so that the rod 41 is pulled, the spring 412 makes contact with the P-in gear 42. When the rod 41 is further pulled, the P-in gear 42 is biased by the spring 412, so that the P-in gear 42 moves toward the bush 44. In this structure, the manual operation force applied to axially moving the rod 41 is transmitted to the P-in gear 42 when the rod 41 is moved toward the bush 44. In addition, the manual operation force applied to axially moving the rod 41 is not transmitted to the P-in gear 42 when the rod 41 is moved toward the plate 411.

Next, an operation of the manual device 40 is described.

When an occupant such as the driver manipulates the non-electricity operating lever 49 to move the rod 41 toward the bush 44, the spring 412 biases the P-in gear 42 toward the bush 44. The output shaft gear 39 of the electric motor 22 is engaged with the P-in gear 42, and is rotated in the direction B (FIGS. 1, 2), so that the motor output shaft 38 of the electric motor 22, the control rod 50, and the detent plate 52 rotate. Consequently, the parking lock device 70 is actuated to the lock state, and the manual valve 60 moves to the P-range position. Specifically, the manual operation force applied to the non-electricity operating lever 49 is transmitted to the control rod 50 via the manual device 40, thereby operating the parking lock device 70 and the manual valve 60.

The occupant moves the rod 41 toward the bush 44, thereafter, the occupant releases a hand from the non-electricity operating lever 49. In this condition, the spring 412, which is in contact with the P-in gear 42 and resiliently deformed, applies resilience to the rod 41, so that the rod 41 moves toward the plate 411. In this operation, the occupant operates the non-electricity operating lever 49 to move the rod 41 toward the bush 44, thereafter, the rod 41 moves toward the plate 411. In this condition, the spring 412 is not hooked to the P-in gear 42, so that resilience of the spring 412 and the manual operation force are not transmitted to the P-in gear 42. Thus, the parking lock device 70 is maintained at the lock state, and the manual valve 60 is maintained at the P-range position. Specifically, the detent plate 52 is engaged with the detent spring 62, so that the parking lock device 70 is maintained at the lock state.

In this embodiment, the manual device 40 permits transmission of the manual operation force in a direction in which the parking lock device 70 is brought to the lock state. In addition, the manual device 40 prohibits transmission of the manual operation force in a direction in which the parking lock device 70 is brought to the lock-release state.

A person may maliciously operate the non-electricity operating lever 49 to manipulate the parking lock device 70 to the lock-release state, when a vehicle is parked in a condition where the parking lock device 70 is in the lock state and the shift range is in the P-range. Even in this condition, transmission of the manual operation force is prohibited in the direction in which the parking lock device 70 is to the lock-release state. The parking lock device 70 cannot be manipulated to the lock-release state, as long as the non-electric power condition continues. Therefore, the vehicle can be protected against theft.

In contrast, transmission of the manual operation force is permitted in the direction in which the parking lock device 70 is to the lock state. Therefore, the vehicle can be parked after manually operating the parking lock device 70 to the lock state, even in the non-electric power condition.

In this embodiment, the manual device 40 includes the manual-device case 43 accommodating the P-in gear 42 such that the P-in gear 42 is slidable in the manual-device case 43. Therefore, the vehicle can be further effectively protected against theft by a malicious person intending as follows. Specifically, the malicious person may intend to actuate the parking lock device 70 to the lock-release state by directly manipulating the P-in gear 42, which is regularly engaged with the motor output shaft 38. However, even in this condition, the P-in gear 42 is accommodated in the manual-device case 43, so that the P-in gear 42 can be protected from being directly manipulated by the malicious person.

In this embodiment, the rod 41 is slidably supported in the manual-device case 43 via the plate 411 and the bush 44. In addition, the P-in gear 42 is slidably supported by the rod 41. In this structure, the rod 41 and the plate 411, which need high mechanical strength for transmitting the manual operation force, serve as support members for supporting the P-in gear 42 being frequently operated. In addition, the manual-device case 43, which does not necessarily need high mechanical strength, serves as a support member for supporting the rod 41 and the plate 411 being not frequently operated. In this structure, the manual-device case 43 can be formed of a further light-weight material such as aluminum or aluminum alloy, compared with a structure in which the manual-device case 43 slidably supports the P-in gear 42.

In this embodiment, the electric motor 22 is a brushless motor. Accordingly, electricity supplied to each of the coils of U, V, W-phases needs to be sequentially switched to rotate the electric motor 22. Therefore, even when a malicious person simply supplies electricity to the coils of the electric motor 22 using a battery, the electric motor 22 cannot be rotated. Therefore, in the above structure, it is further difficult to maliciously rotate the electric motor 22 in order to bring the parking lock device 70 to the lock-release state. Thus, the operation of the manual device 40 to prohibit transmission of the manual operation force, which brings the lock-release state, can be further enhanced, so that the vehicle can be further protected against theft.

In the above structure, the one-way transmission unit 41, 411, 412, 42 includes the P-in gear 42 regularly engaged with the output shaft gear 39. The one-way transmission unit 41, 411, 412, 42 further includes the one-way hook member 41, 411, 412 constructed of the rod 41, the plate 411, and the spring 412.

The one-way hook member 41, 411, 412 is axially movable when being applied with the manual operation force. The one-way hook member 41, 411, 412 is capable of being hooked to the P-in gear 42 when axially moving in one axial direction on the left side in FIG. 2. The one-way hook member 41, 411, 412 is incapable of being hooked to the P-in gear 42 when axially moving in the other axial direction on the right side in FIG. 2.

In the above structure, when the manual operation force is applied to the manual device 40, the one-way transmission unit 41, 411, 412, 42 permits transmission of the manual operation force to the parking lock device 70 when being brought to the lock state. In addition, the one-way transmission unit 41, 411, 412, 42 prohibits transmission of the manual operation force to the parking lock device 70 when being brought to the lock-release state.

In the above structure, driving force of the electric motor 22 can be restricted from being transmitted to the one-way hook member 41, 411, 412 in a simple structure.

In the above structure, the one-way hook member 41, 411, 412 is axially slidable in the non-electric power condition. In contrast, the P-in gear 42 axially moves regularly when the electric motor 22 is energized in the normal condition. Therefore, the P-in gear 42 needs high ablation resistance. In addition, the one-way hook member 41, 411, 412 slidably supporting the P-in gear 42, which is frequently operated, needs ablation resistance higher than the manual-device case 43 slidably supporting the one-way hook member 41, 411, 412, which is less frequently operated.

In view of the structure, the P-in gear 42 is also preferably formed of a rigid material such as a ferrous material for producing high ablation resistance and mechanical strength of, in particular, the gear tooth thereof. The one-way hook member 41, 411, 412 is also preferably formed of a rigid material such as a ferrous material for producing high ablation resistance and mechanical strength needed to transmit the manual operation force. In contrast, the manual-device case 43 necessarily need not produce high mechanical strength, and is preferably formed of lightweight material such as aluminum or aluminum alloy.

An operation of the shift-by-wire control system of the automatic transmission device 100 in the above embodiment may be, for example, summarized as follows. Transmission of the manual operation force applied by the occupant (operator) is permitted when the manual operation force is applied to lock the output shaft of the automatic transmission device 100 in a condition where electricity supply stops in the shift-by-wire control system and the electric motor 22 stops, and the shift position of the automatic transmission device 100 is in the P-range. Transmission of the manual operation force is prohibited when the manual operation force is applied to release the lock of the output shaft in a condition where electricity supply stops in the shift-by-wire control system and the shift position is in the P-range.

Other Embodiment

The non-electricity operating lever 49 is not limited to being provided in the vehicle interior. The non-electricity operating lever 49 may be provided in an engine room of the vehicle, or the like.

The electric motor 22 is not limited to a brushless motor. The electric motor 22 may be a motor having a brush.

The above processings such as calculations and determinations are not limited being executed by the ECU 80. The control unit may have various structures including the ECU 80 shown as an example.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A shift-by-wire control system for an automatic transmission device manipulated by an operator, the shift-by-wire control system comprising:

a range switching unit for switching a shift range of the automatic transmission device between a P-range and an other shift range than the P-range;

a parking lock device adapted to bringing an output shaft of the automatic transmission device to a lock state in conjunction with the range switching unit when switching to the P-range, the parking lock device adapted to bringing the output shaft of the automatic transmission device to a lock-release state in conjunction with the range switching unit when switching to the other shift range;

an electric motor for actuating the range switching unit and the parking lock device in accordance with an instruction of the operator;

a manual device for transmitting manual operation force of the operator to the parking lock device to actuate the parking lock device when the electric motor stops;

a motor output shaft for transmitting torque of the electric motor to the parking lock device; and an output shaft gear rotatable integrally with the motor output shaft, wherein the manual device includes a one-way transmission unit adapted to permitting transmission of the manual operation force in a direction in which the parking lock device is brought to the lock state, the one-way transmission unit is adapted to prohibiting transmission of the manual operation force in a direction in which the parking lock device is brought to the lock-release state, the one-way transmission unit includes at least a P-in gear adapted to be engaged with the output shaft gear and a rod adapted to transmit manual operation force, the rod is supported by a case accommodating the P-in gear and axially movable relative to the case, and the P-in gear is supported by the rod and movable relative to the rod.

2. The shift-by-wire control system according to claim 1, wherein the P-in gear is regularly engaged with the output shaft gear.

3. The shift-by-wire control system according to claim 1, wherein the one-way transmission unit includes the rod and is capable of being hooked to the P-in gear when axially moving toward one side when being allied with the manual operation force, and the one-way transmission unit is incapable of being hooked to the P-in gear when axially moving toward an other side.

4. The shift-by-wire control system according to claim 1, wherein at least one of the P-in gear and the one-way transmission unit is formed of a ferrous material, and the case is formed of aluminum or aluminum alloy.

5. The shift-by-wire control system according to claim 1, wherein the electric motor is a brushless motor.

* * * * *